June 29, 1937.  E. M. KRUEGER  2,085,224
RECORDING METER
Filed Dec. 26, 1931  2 Sheets-Sheet 1

Inventor
Emil M. Krueger
By
Wheeler, Wheeler & Wheeler
Attorneys

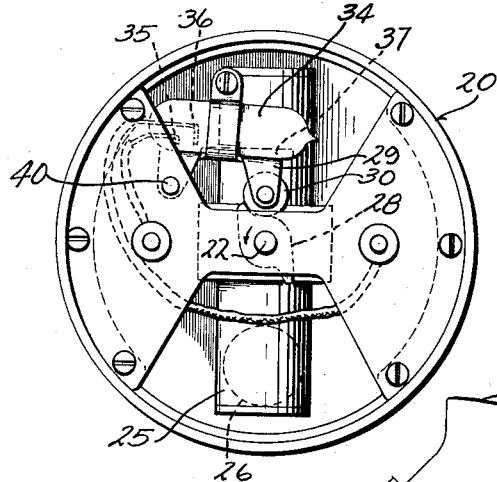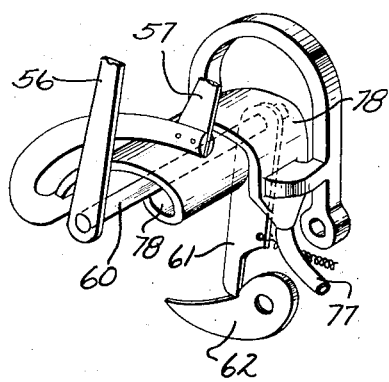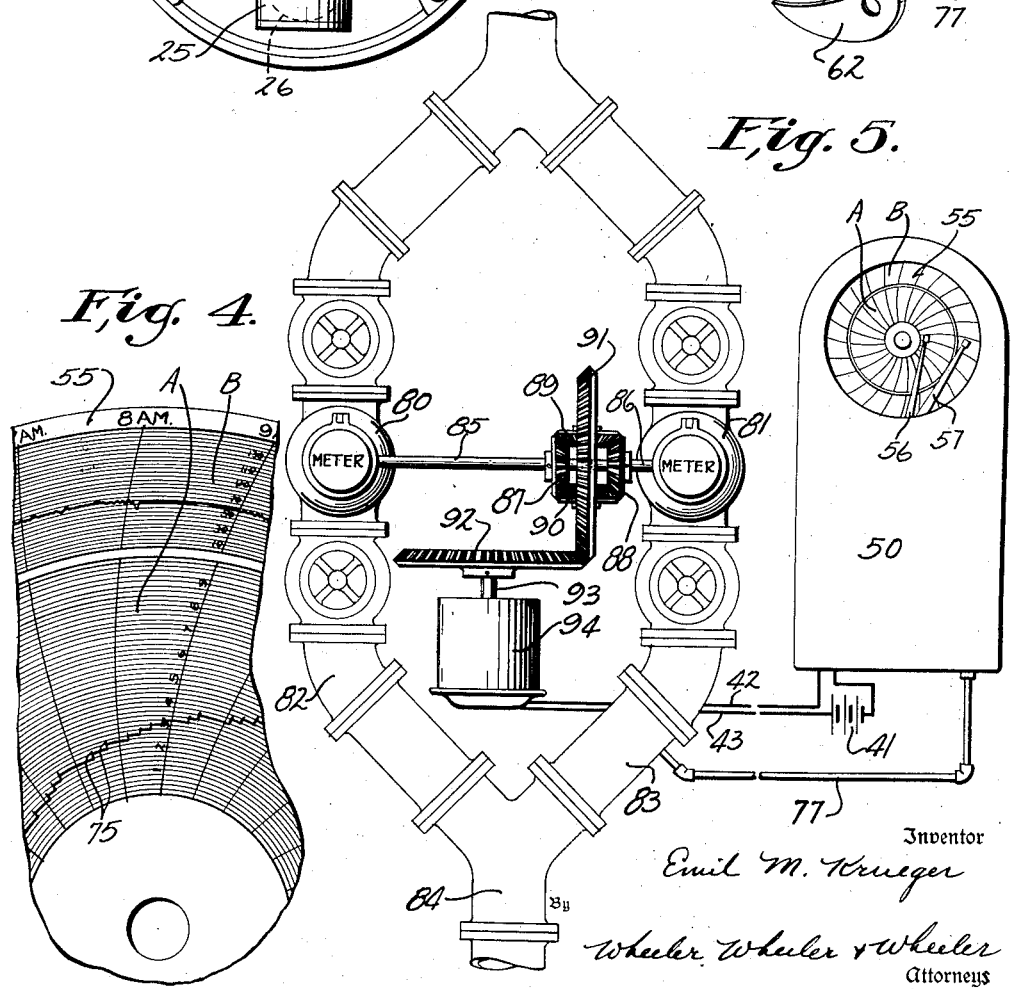

UNITED STATES PATENT OFFICE 2,085,224

RECORDING METER

Emil M. Krueger, Milwaukee, Wis., assignor to Badger Meter Manufacturing Company, Milwaukee, Wis., a corporation of Wisconsin Application December 26, 1931, Serial No. 583,280

13 Claims. (Cl. 234—34)

This invention relates to improvements in recording meters.

The time chart on any recording instrument is usually developed on a rather small scale, and if the operation of the recorder is continuously responsive to the meter or other actuating device, interpretation of the chart with accuracy is very difficult. In fact, it is frequently impossible to ascertain exactly when the meter or other like device has been subjected to abnormal demands. One of the important objects of the present invention, therefore, is to provide a recording device wherein the recording instrument has a step by step advance in accordance with unit operations of the meter or other mechanism to which it is attached. Preferably, the recording instrument is so mounted that it will overrun radially of the chart the position at which it will ultimately come to rest in each such advance step, with the result that the exact instant of time at which such unit operation of the metering mechanism is completed is permanently displayed upon the chart.

Another purpose of the invention is to facilitate the interpretation of meter readings by providing mechanism for recording on a single chart not only the units of meter operation, but also the corresponding pressures over like periods of time. The comparative graphs of flow and pressure on a single time chart greatly facilitate analysis of the circuit in which the apparatus is disposed.

It is a further object of the invention to provide novel and improved means for taking meter readings electrically, whereby to facilitate the operation of a recording mechanism such as above referred to, and to enable the recording mechanism to function at any desired distance from the meter. The electrical mechanism herein disclosed is susceptible of adaptation to the requirements of a single compound or duplex meter installation.

In the drawings:

Figure 2 is a side elevation of the switch casing illustrated in Figure 1 as such casing appears with its cover removed.

Figure 3 is a detail in perspective on an enlarged scale showing a fragmentary portion of the mechanism whereby the recording pens are operated in the device shown in Fig. 1.

Figure 4 is an enlarged fragmentary detail of a chart made by apparatus embodying this invention and disclosing the characteristic graphs produced by such apparatus.

Figure 5 is a front elevation of a duplex meter installation equipped with recording mechanism embodying this invention.

Like parts are identified by the same reference characters throughout the several views.

Figure 1:
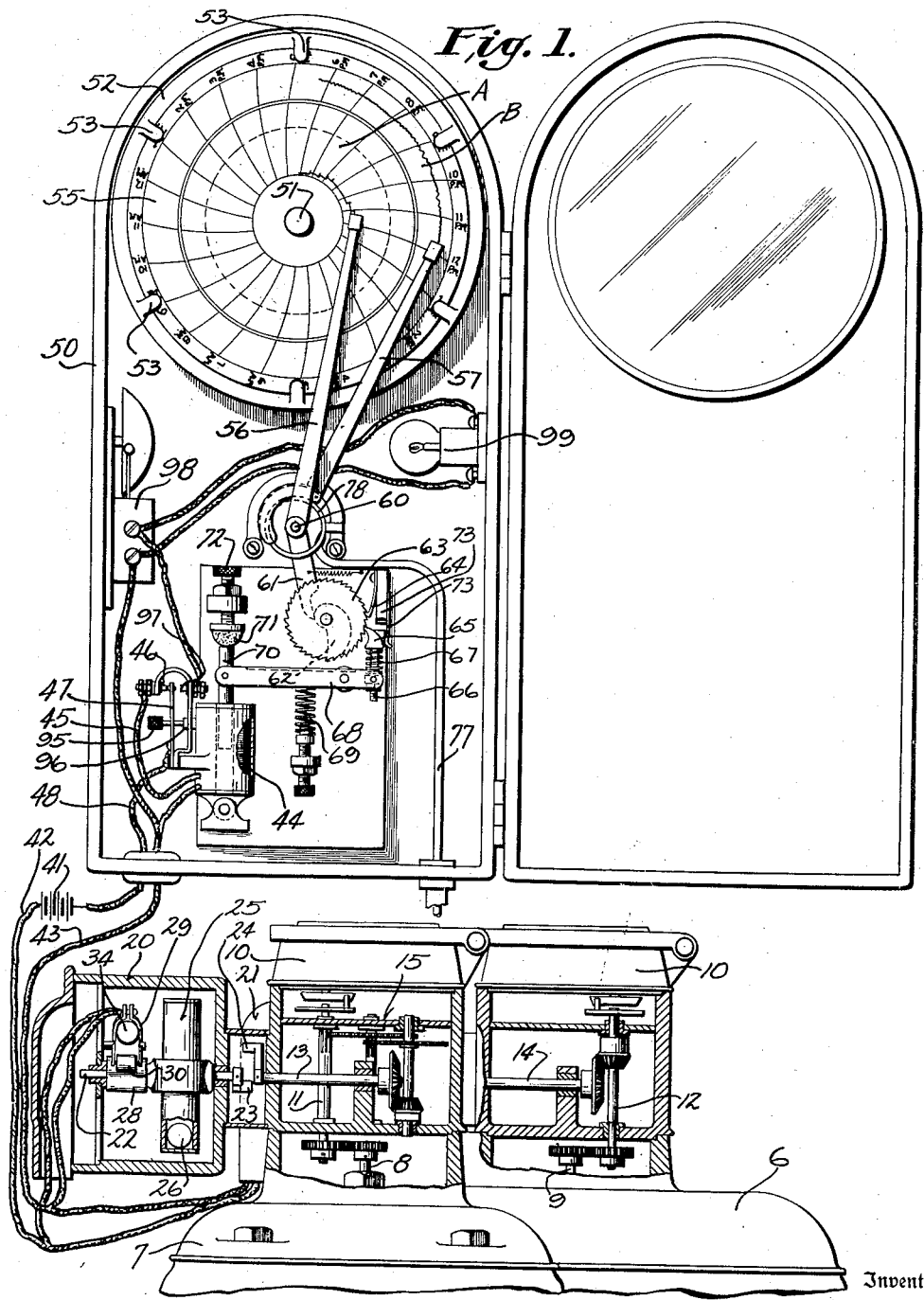
Figure 1 is a front elevation of a recording instrument and a compound meter installation, wherein portions of the gear trains and switch housing are broken away in vertical section to expose the interior parts.

The recording mechanism herein disclosed is particularly adapted for use in conjunction with flow measuring means of which the water meters herein disclosed may be taken as typical.

The meter shown in Fig. 1 is known as a compound meter including a high flow chamber 6 and a low flow chamber 7. The interior mechanism may be of any desired construction and may, for example, correspond to the disclosure of Patent No. 1,186,802 dated June 13, 1916. In such a meter the measuring apparatus in the two chambers is not in use concurrently, the entire flow taking place alternatively either through the low flow chamber 7 or the high flow chamber 6 to operate the shafts 8 and 9 which project therefrom. Each meter casing carries the usual indicator dial case at 10, motion being transmitted thereto from meter shaft 8 through drive shaft 11, and from meter shaft 9 by drive shaft 12.

For the purposes of the present invention motion is derived from the drive shafts 11 and 12 for the operation of switch actuators 13 and 14 respectively. In the case of the high flow meter the switch actuator 14 may be driven directly from drive shaft 12 through bevel gearing as shown in Fig. 1. In the case of the low flow portion of the compound meter a reduction gear train 15 is interposed between the drive shaft 11 and the switch actuator 13. In any event, the arrangement is such that for a given unit flow through either metering mechanism the switch actuator affected will have a given degree of rotation.

If, for example, shaft 14 is made by the design of the bevel gearing to rotate once for each one hundred gallons of water passing through meter casing 6, then switch actuator 13 will also preferably be designed to make one complete rotation for each one hundred gallons of water passing through meter casing 7, although, in order to indicate this smaller volume of flow in the desired detail on the dials in casing 10, the drive shaft 11 may rotate many times in excess of what would be required in the way of rotation of drive shaft 12 in the course of a similar flowage through casing 6.

Each of the switch actuating shafts 13 and 14 operates its own switch mechanism. These switch mechanisms may be identical and hence only one of them has been illustrated in detail. Each of the switch casings 20 and 21 contains a switch shaft 22 having a crank pin at 23 with which a complementary crank pin 24 on the switch actuator is engageable. The switch shaft 22 carries a tube 25 closed at its ends and preferably disposed on a diameter of the shaft.

A ball 26 is freely movable in tube 25 and its weight tends yieldably to determine either one of two diametrically opposite positions of the switch shaft from which the switch shaft may be displaced by movement communicated to it through the meter drive shaft, the operating gearing, the switch actuator, and cranks 23 and 24. When the displacement of the shaft 22 and tube 25 amounts to something in excess of ninety degrees from the position in which the parts are illustrated in Fig. 1, the ball 26 will roll to the opposite end of tube 25 and the weight of the ball in this new location will cause shaft 22 to overrun beyond the corresponding location of the switch actuator and thereby momentarily to close and then to re-open an electrical circuit through means hereinafter to be described.

Switch shaft 22 carries a double nosed cam 28 upon which rides a cam follower 29 preferably having an anti-friction roller at 30. The cam noses are preferably so formed as to act sufficiently irreversibly upon the roller so that in practice they do not move clockwise from the position in which the parts appear in Fig. 2. The cam follower carries a mercury switch vial 34 containing contacts 35 and 36 and a small quantity of mercury at 37.

As shaft 22 is moved counter-clockwise through motion derived from the meter as above described and ultimately is advanced by the transfer of the weight of ball 26, one of the noses of cam 28 will pass beneath roller 30, thereby sharply lifting the cam follower about its fulcrum at 40 and permitting it to drop again by gravity after the nose reaches the position shown in Fig. 2, to which it is adjusted by the weight 26. In the course of these operations the mercury 37 rolls to the end of vial 34 in which contacts 35 and 36 are located, and there completes an electrical connection between said contacts and the electrical leads therefrom.

As shown in Fig. 1, the battery 41 supplies current to a wire 42 which has a branch going to each of the switches located in casings 20 and 21 respectively. From these casings lead corresponding branches of conductor 43 which extends to a solenoid coil at 44 grounded to the battery by means of conductor 45, contact 46, spring contact 47, and conductor 48.

Thus, I have provided an electrical circuit in which the switch mechanism in casings 20 and 21 are in parallel to control solenoid 44. The closing of either switch will transmit a momentary electrical impulse through the circuit, thereby electromagnetically energizing for a brief period the solenoid 44.

The solenoid 44, and the housing 50 in which it is located, may be at any desired distance from the flow measuring device. Housing 50 contains the recording mechanism which will now be described.

Shaft 51 is driven by the usual clockwork, which it is not necessary to describe here. It carries the usual dial 52 on which, in the usual manner, the tongues 53 support a graph sheet 55 which is preferably made specially for the purposes of the present invention. The record disk 55 is calibrated radially by lines indicating minutes of time and having an arcuate form concentric with the axis of the recording pen arms 56 and 57. Each of these lines may be designated in its proper hour or other time unit upon the periphery of the record disk.

Between the center of the disk and its periphery the disk is divided into zones A and B, each of which is subdivided along radial lines by concentric circles indicating units of flow in area A and units of pressure in area B. In order that the graphs described in areas A and B by the respective recording arms 56 and 57 may be peripherally correlated with each other and with the time lines, it is desirable that the arms have a common center or axis as herein illustrated.

The arm 56 is mounted on a rock shaft 60 which carries a cam follower rocker arm 61 operating on cam 62. This cam is fixed to turn with a ratchet wheel 63 held against clockwise rotation by a spring-pawl 64 and driven by the reciprocation of an actuating pawl 65 which is yieldably mounted by post 66 and spring 67 upon the armature lever 68. A spring 69 normally supports the armature lever with its armature 70 in engagement with a bumper at 71 which is adjustable by means of a screw 72. When the solenoid 44 is energized to attract armature 70 against the compression of spring 69, the pawl 65, held to the ratchet 63 by spring 73, vigorously advances the ratchet in a counter-clockwise direction as viewed in Fig. 1, until the pawl strikes the stop block 74 upon which spring-pawl 64 and springs 73 are mounted.

The degree of advance of the actuating pawl 65 is somewhat in excess of one tooth of ratchet 63, thus occasioning a certain amount of overrun of ratchet 63 beyond the ultimate position to which it is frictionally retracted in a clockwise direction under the pressure of spring 69 which restores the parts to their Fig. 1 positions upon cessation of the electromagnetic impulse. This overrun of the ratchet is reflected and multiplied by the length of recording arm 56 to produce a corresponding overrun on the graph on recording disk 55, as clearly shown at 75 in Fig. 4. The radial overrun of the recorder arm on the disk, and the line 75 produced thereby, sharply accentuate for the observer the point at which the unit flow through the meter was completed. Thus, a new degree of accuracy in the analysis and interpretation of meter records is made possible.

As above noted, the arm 57 records pressures on disk 55 which are correlated in point of time with the flow record produced by arm 56. A pressure conduit 77 leads from the line (whether fluid or electrical) in which the meters are located. To carry out the illustrative use of water meters, I have shown conduit 77 to comprise a pipe communicating with a Bourdon tube at 78 which is wound helically about the axis of shaft 60 and carries arm 57. The helical disposition of the Bourdon tube about shaft 60 causes this particular form of pressure indicator to respond in such a way that the movement of arm 57 will be about the same axis as that about which arm 56 is movable.

If the meters 6 and 7 were concurrently in operation, the two switches operated thereby might occasionally move synchronously to produce a single impulse for the energization of solenoid 44 where accuracy would require two separate impulses to be transmitted to the recording arm. The construction disclosed in Fig. 1, therefore, is peculiarly adapted to a compound meter installation in which the metering devices are subject to alternative rather than concurrent operation.

In Fig. 5 I have illustrated the application of the invention to a duplex meter installation in which two ordinary meters 80 and 81 are separately mounted in branches 82 and 83 of a water main 84. Their switch actuating shafts 85 and 86 drive bevel gears 87 and 88 respectively with, which mesh pinions 89 and 90 carried by a ring gear or output device 91. The gearing described constitutes an integrating gear set whereby the ring gear 91 will have a movement proportioned to the sum or resultant of the movement of the shafts 85 or 86 regardless of whether they operate independently or concurrently. The integrated movement derived from both meters is then transmitted to gear 92 through the switch actuator 93 which operates switch mechanism in casing 94, which may exactly correspond to that above described. From this casing the conductors 42 and 43 lead, as above noted, to battery 41 and to the recording mechanism housed in casing 50. The main is tapped by the pressure pipe 77 above described, which also leads to said casing for the operation of arm 57.

The operation of the switches herein disclosed is impositive, and if anything should occur to prevent the breaking of the contact which is intended to be established only momentarily by the movement produced by the shifting of weight 26, the solenoid would become overheated. In any such case, also, the recording mechanism would become inoperative. To give warning of such a situation, I provide in spring contact 47 a thumb screw 95 which engages a block of shellac or other low melting point substance 96 to maintain spring contact 47 in engagement with fixed contact 46. If the shellac or like material at 96 is melted, the spring 47 is released to open the circuit through contact 46 and close a shunt circuit through contact 97, which energizes the electric warning bell 98 and the lamp at 99, thus apprising the operator of the abnormal condition in the circuit.

I claim:

1. A recording device comprising the combination with means for supporting a record chart, of a recording element movable across said chart, cam and cam follower means for actuating said element, and means for intermittently operating said cam means in predetermined rotative steps and including means for arresting said cam means at the conclusion of each step in a position which is less advanced than a position of said cam means in the course of its actuation to said step, whereby to produce an overrun of said recording element on said chart upon the occasion of each advancing movement of said recording element.

2. A recording instrument comprising the combination with a ratchet and a pawl co-acting therewith to fix each position at which said ratchet comes to rest, of a recording member provided with connections operated by said ratchet to advance said member, a second pawl engaging said ratchet for the actuation thereof, and means for intermittently reciprocating said second pawl through a range of movement in excess of that required for the actuation of said ratchet to a position for engagement with said first mentioned pawl, whereby to overrun said recording member on the occasion of each operation thereof.

3. A recording device comprising the combination with a movable chart and a recording member movable transversely with respect to the direction of chart movement, of mechanism for the operation of said recording member including a reciprocable member, electromagnetic means for intermittently imparting to said member a stroke having an amplitude in excess of unit advance upon energization of said means, means for stopping the return of said member at a point representing unit advance and electrical connections including means remote from said recording member for energizing said electromagnetic means.

4. A recording instrument comprising the combination of a recording member, a cam follower connected therewith, a cam co-acting with said follower, a ratchet connected with the cam, a ratchet position determining pawl operatively engaging the ratchet, a reciprocable operating pawl movable through a range in excess of that required to enable the ratchet pawl to engage with the ratchet and intermittently operable means for reciprocating said operating pawl.

5. The combination with a plurality of meters and a single electrically operable total flow recording instrument, of means for actuating said instrument in accordance with the operation of said meters to indicate the total flow therethrough, and including switches in parallel controlling the operation of said instrument and means for actuating said switches from the respective meters upon the passage of a predetermined unit of flow through either, said means being constituted to permit only momentary closing of said switches regardless of the operation of said meters.

6. The combination with a pair of meters in parallel, of a single recording means, and actuating means operatively connected to be driven by both of said meters and to operate said recording means to draw a graph indicating the total flow therethrough, said recording means being arranged to be actuated in step by step movements indicative of predetermined increments of flow through said meters, and arranged to produce at the termination of each step a line accentuating the difference in position of the succeeding step said actuating means including mechanism for reciprocating said recording means through a stroke in excess of a single step of advance thereof, and mechanism for stopping the return of said recording means at successive points each representative of a single step of advance.

7. A recording instrument for use with a rotatable disk calibrated in a generally radial direction in units of time, said instrument comprising the combination of a support for such a disk, and separate means for mechanically graphing flowage and pressure records upon separate areas of said disk in properly correlated positions respecting the time calibrations thereon.

8. A recording device comprising the combination with means for supporting for rotation a disk calibrated in units of time, of a plurality of co-axially mounted pivotally movable recording markers having marking portions movable in a general radial direction across different concentric portions of said disk, flow operated means for actuating one of said markers, and pressure operated means for independently actuating the other, said markers being of such length that the records made thereby are correlated as to time.

9. In a device of the character described, the combination with a meter operated shaft provided with a coupling, of a driven shaft provided with a coupling arranged to receive motion from the coupling of said meter operated shaft, said couplings being adapted to permit a limited independent movement of the driven shaft in a forward direction, means energized by the movement of the driven shaft for producing independent rotation thereof within said range following a predetermined period of operation by said meter operated shaft, a cam carried by said driven shaft, and a switch provided with a cam follower co-acting with said cam and adapted to be closed and opened by the independent movement of the driven shaft in said range.

10. In a device of the character described, the combination with a meter operated shaft provided with a coupling, of a driven shaft provided with a coupling arranged to receive motion from the coupling of said meter operated shaft, said couplings being adapted to permit a limited independent movement of the driven shaft in a forward direction, means energized by the movement of the driven shaft for producing independent rotation thereof within said range following a predetermined period of operation by said meter operated shaft, a cam carried by said driven shaft, and a switch provided with a cam follower co-acting with said cam and adapted to be closed and opened by the independent movement of the driven shaft in said range, together with an electrical circuit controlled by said switch and including an electromagnet, an armature operated by said magnet, a recorder, and motion transmitting connections from said armature to said recorder, whereby said recorder will respond to impulses occurring in the course of rotation of said meter operated shaft.

11. The combination with a meter and a recording element, of means for actuating said recording element including devices providing for a flow of energy and mechanism responsive to said flow and arranged to operate said recording mechanism, a shaft driven from said meter, a driven shaft, means loosely connecting said shafts for the transmission of motion from one to the other while permitting limited independent movement of the driven shaft, means deriving energy from a predetermined forward movement of the driven shaft for independently actuating said driven shaft through an additional range of forward movement, means controlling the above mentioned flow of energy, and means actuated from said driven shaft and operating said controlling means to permit only a momentary flow of energy, and only during movement of said driven shaft through said additional range of forward movement.

12. A device for recording flow and requiring a large range of flow to be indicated in limited space in small unit increments, said device comprising the combination with means for advancing a record sheet, of a stylus movable transversely with respect to the path of advance of said sheet, means biasing said stylus against movement across said sheet, a cam and cam follower for the progressive advance of said stylus in opposition to its said bias, a ratchet connected with said cam for the actuation thereof and provided with small teeth defining minute increments of advance of said stylus, stop means opposing retrogressive movement of said stylus from any position and engageable with successive teeth to define positions of said stylus representing minute increments of advance thereof across said sheet, pawl means acting upon successive teeth for the advance thereof in minute unit increments from said stop means, and mechanism intermittently operable and connected with said pawl means for the operative stroke of said pawl means for a distance in excess of the movement required for a one tooth advance but less than a two tooth advance thereof, whereby to produce a slight overrun of said stylus in each unit increment of movement thereof to accentuate the point on said sheet at which such increment occurs.

13. A combined flow and pressure recording device comprising the combination with means for advancing a record sheet, of a pair of styluses operable upon different areas of the record sheet and disposed in correlated relative positions with respect to said sheet, whereby their respective movements at a given time in the advance of said sheet is directly comparable, pressure operated means acting upon one of said styluses, a meter to which the other stylus is subject, and actuating connections from said meter to said other stylus including mechanism for the step by step movement of said other stylus in minute increments, said mechanism including a motion transmitting train productive of a substantial degree of overrun in each unit increment of movement, whereby to designate in point of time upon said sheet the exact moment at which each unit increment of advance occurs.

EMIL M. KRUEGER.